United States Patent
Liao

(10) Patent No.: US 9,675,912 B2
(45) Date of Patent: Jun. 13, 2017

(54) HEAT-PRESSED ACTIVATED CARBON POLYPROPYLENE COMPOSITE FILTER DEVICE

(71) Applicant: I-Chung Liao, Taichung (TW)

(72) Inventor: I-Chung Liao, Taichung (TW)

( * ) Notice: Subject to any disclaimer, the term of this patent is extended or adjusted under 35 U.S.C. 154(b) by 417 days.

(21) Appl. No.: 14/016,192

(22) Filed: Sep. 2, 2013

(65) Prior Publication Data

US 2015/0060355 A1    Mar. 5, 2015

(51) Int. Cl.

| | |
|---|---|
| *B01D 29/00* | (2006.01) |
| *B01D 63/00* | (2006.01) |
| *B01D 29/11* | (2006.01) |
| *B01D 39/16* | (2006.01) |
| *C02F 1/44* | (2006.01) |
| *C02F 9/02* | (2006.01) |

(52) U.S. Cl.
CPC ........ *B01D 29/117* (2013.01); *B01D 39/1623* (2013.01); *B01D 2239/0407* (2013.01); *B01D 2239/0622* (2013.01)

(58) Field of Classification Search
CPC .... B01D 27/14; B01D 27/144; B01D 27/146; B01D 29/00; B01D 29/0047; B01D 29/0052; B01D 29/0054; B01D 29/11; B01D 29/46; B01D 29/117; B01D 35/14; B01D 39/1623; B01D 61/00; B01D 61/08; B01D 61/18; B01D 61/025; B01D 61/28; B01D 61/366; B01D 61/46; B01D 63/00; B01D 65/00
USPC ............. 210/162, 163, 263, 321.6, 490, 660
See application file for complete search history.

(56) References Cited

U.S. PATENT DOCUMENTS

2002/0130083 A1* 9/2002 Middleton ............... B01J 20/20
                                                    210/660
2005/0279210 A1* 12/2005 Hirata ................ B01D 53/0415
                                                    96/138

(Continued)

FOREIGN PATENT DOCUMENTS

| CN | 203007049 U | * | 6/2013 | ................ C02F 9/02 |
| CN | 203075749 U | * | 7/2013 | ................ C02F 9/02 |
| CN | 203483972 U | * | 3/2014 | ............. B01D 29/33 |

OTHER PUBLICATIONS

CN203007049U Chen—Polypropylene compressed active carbon water purification filter element [Abstract, MT & Drawings; Jun. 19, 2013; 9 pages].*

(Continued)

*Primary Examiner* — Dirk Bass
*Assistant Examiner* — Hayden Brewster
(74) *Attorney, Agent, or Firm* — Chun-Ming Shih; HDLS IPR SERVICES

(57) ABSTRACT

A heat-pressed activated carbon polypropylene composite filter device has a central filtering core, a composite filtering core, and two covers. The composite filtering core is mounted around the central filtering core and has a carbon-polypropylene filter layer and a polypropylene layer. The carbon-polypropylene filter layer is made of nonwoven polypropylene on which multiple activated carbon granules are heat-pressed. The polypropylene layer is made of polypropylene and is covered on the carbon-polypropylene filter layer by a meltblown process. The covers are mounted on the ends of the composite filtering core respectively.

2 Claims, 5 Drawing Sheets

(56) References Cited

U.S. PATENT DOCUMENTS

2007/0096372 A1* 5/2007 Qinhua ............... B01D 39/163
        264/640
2012/0031832 A1* 2/2012 Yamaguchi .......... B01D 29/111
        210/450

OTHER PUBLICATIONS

CN203075749U Liao—Hot-pressing active carbon polypropylene composite filter element device [Abstract & MT; Jul. 24, 2013; 15 pages].*
CN203483972U Liao—Polypropylene active carbon composite filtering element [Abstract & MT; EFD Aug. 2, 2013; 14 pages].*

* cited by examiner

HEAT-PRESSED ACTIVATED CARBON POLYPROPYLENE COMPOSITE FILTER DEVICE

BACKGROUND OF THE INVENTION

1. Field of the Invention

The present invention relates to a filter device and, more particularly, to a heat-pressed activated carbon polypropylene composite filter device.

2. Description of Related Art

A conventional water purification device is usually installed on an exit of a running water source to filter the water, such that users can obtain relatively clean water for drinking.

A filter device is mounted in the conventional water purification device. With reference to FIG. 5, a conventional pressed carbon filter device 60 is mounted in the water purification device to filter off the unpleasant odor of the water. The pressed carbon filter device 60 may be made of sintered plastic granules and carbon granules. Each carbon granule is covered by the plastic granule, such that the filtering area of each carbon granule is reduced and that the filtering effect of the pressed carbon filter device 60 is affected.

The pressed carbon filter device 60 has to be assembled with another filter, since the pressed carbon filter device 60 is only used for removing the unpleasant odor. Moreover, a nonwoven layer is mounted around the pressed carbon filter device 60 for capturing the mud in the water to prevent mud from depositing on the pressed carbon filter device 60. As such, the manufacturing process of the pressed carbon filter device 60 is complicated.

SUMMARY OF THE INVENTION

The main objective of the present invention is to provide a heat-pressed activated carbon polypropylene composite filter device to resolve the aforementioned problems.

The heat-pressed activated carbon polypropylene composite filter device has a central filtering core, a composite filtering core, and two covers.

The central filtering core is tubular and has two ends. The composite filtering core is tubular, is mounted around the central filtering core and has two ends, a winding carbon-polypropylene filter layer, and a polypropylene layer. The carbon-polypropylene filter layer is made of nonwoven polypropylene on which multiple activated carbon granules are heat-pressed. The polypropylene layer is made of polypropylene and is covered on the carbon-polypropylene filter layer by a meltblown process. The covers are mounted on the ends of the composite filtering core respectively.

Other objectives, advantages and novel features of the present invention will become more apparent from the following detailed description when taken in conjunction with the accompanying drawings.

DETAILED DESCRIPTION OF PREFERRED EMBODIMENTS

Figure 1:
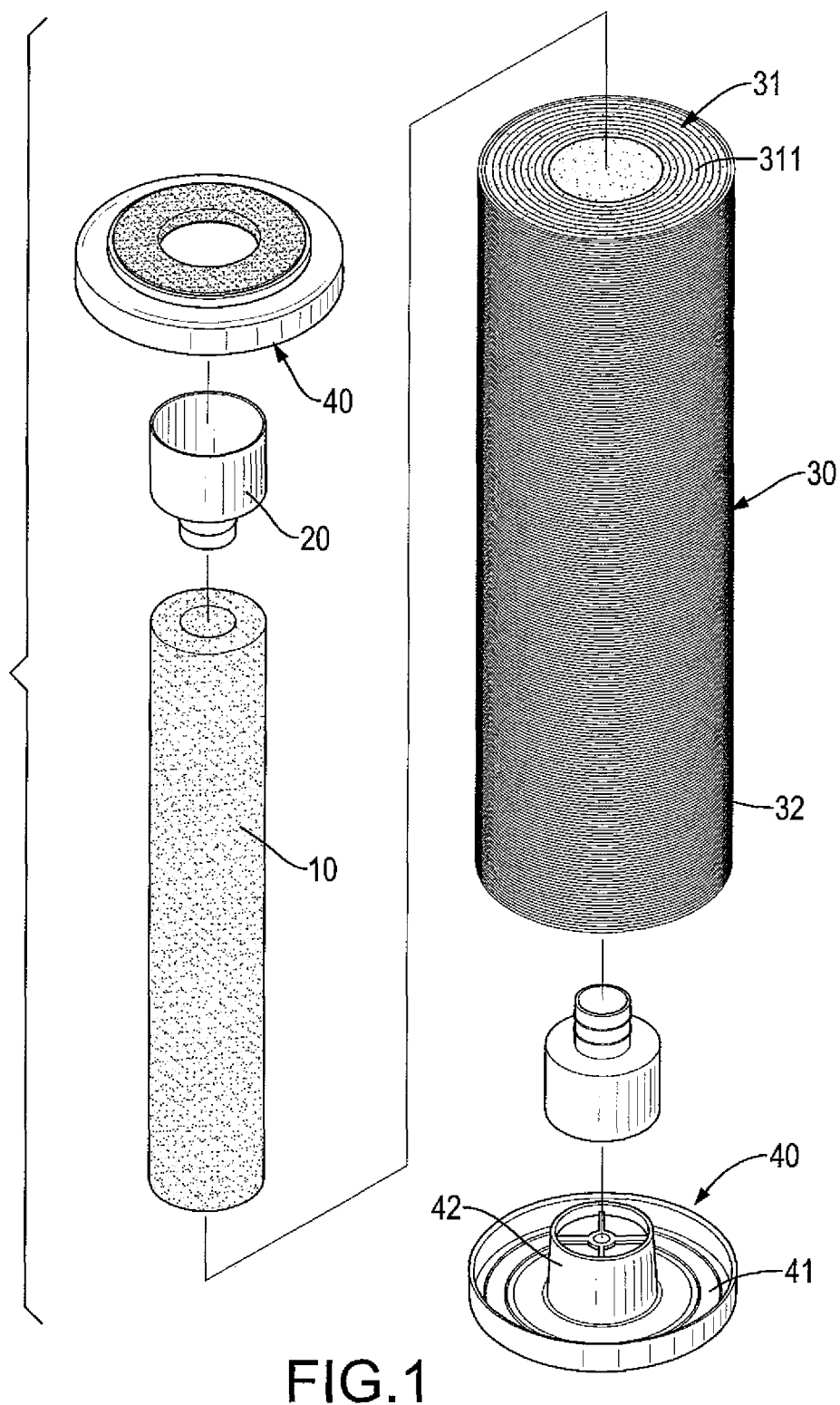
FIG. 1 is an exploded perspective view of a preferred embodiment of a heat-pressed activated carbon polypropylene composite filter device in accordance with the present invention.
Figure 2:
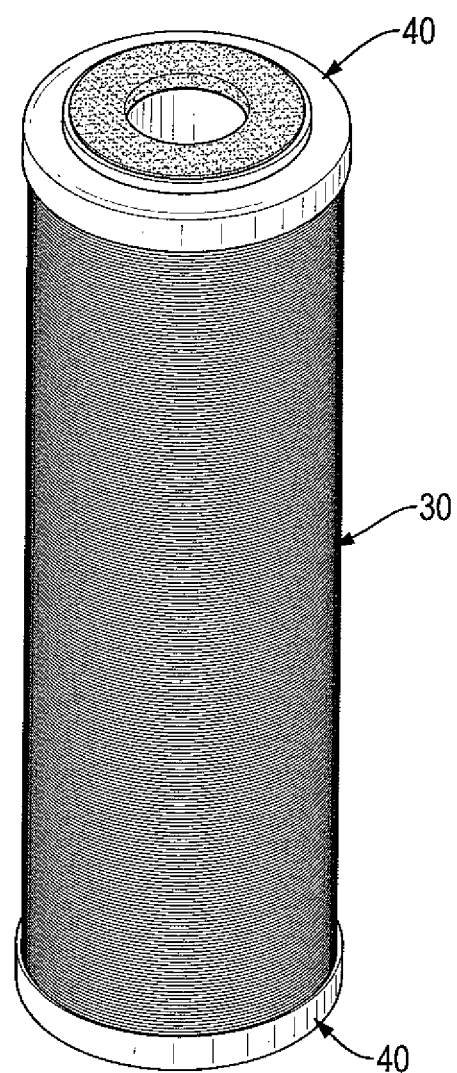
FIG. 2 is a perspective view of the heat-pressed activated carbon polypropylene composite filter device in FIG. 1.
Figure 3:
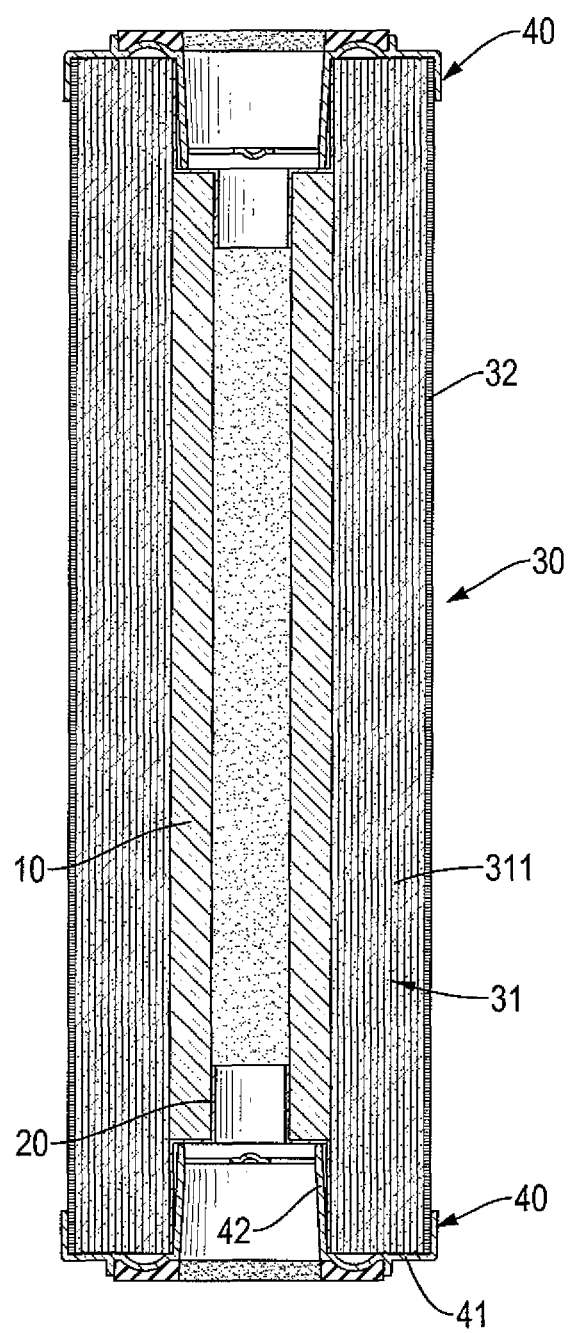
FIG. 3 is a cross sectional side view of the heat-pressed activated carbon polypropylene composite filter device in FIG. 1.

With reference to FIGS. 1 to 3, a preferred embodiment of a heat-pressed activated carbon polypropylene composite filter device in accordance with the present invention has a central filtering core 10, two filter connectors 20, a composite filtering core 30, and two covers 40.

The central filtering core 10 is elongated and tubular, and may be made of meltblown polypropylene.

The filter connectors 20 are hollow longitudinally and are connected with two ends of the central filtering core 10. A part of each filter connector 20 is inserted into the central filtering core 10.

The composite filtering core 30 is mounted around the central filtering core 10 and the filter connectors 20, and has a winding carbon-polypropylene filter layer 31 and a polypropylene layer 32. The carbon-polypropylene filter layer 31 is made of meltblown nonwoven polypropylene on which multiple activated carbon granules 311 are heat-pressed. The activated carbon granules 311 can be spread evenly on the meltblown nonwoven polypropylene, since the activated carbon granules 311 are heat-pressed on the meltblown nonwoven polypropylene. The meltblown nonwoven polypropylene is wound concentrically to form the carbon-polypropylene filter layer 31. The polypropylene layer 32 is made of polypropylene and is covered on the carbon-polypropylene filter layer 31 by a meltblown process.

The covers 40 are annular and are mounted on the filter connectors 20 and the composite filtering core 30. Each cover 40 has an outer portion 41 and an inner portion 42 connected with the middle of the outer portion 41. The outer portions 41 of the covers 40 respectively cover the ends of the composite filtering core 30. The inner portions 42 of the covers 40 are respectively inserted into and communicate with the filter connectors 20.

Figure 4:
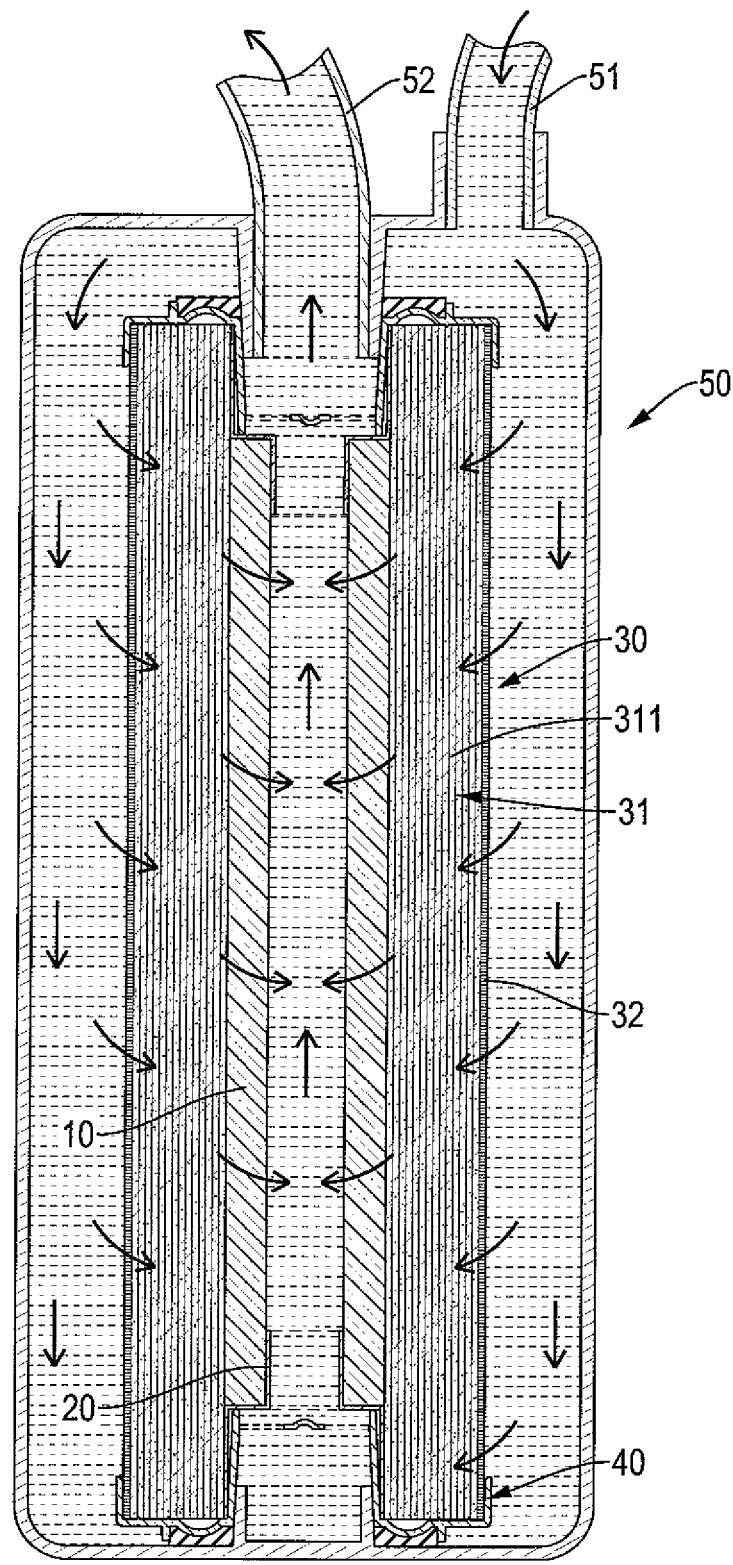
FIG. 4 is an operational cross sectional side view of the heat-pressed activated carbon polypropylene composite filter device in FIG. 1.
Figure 5:
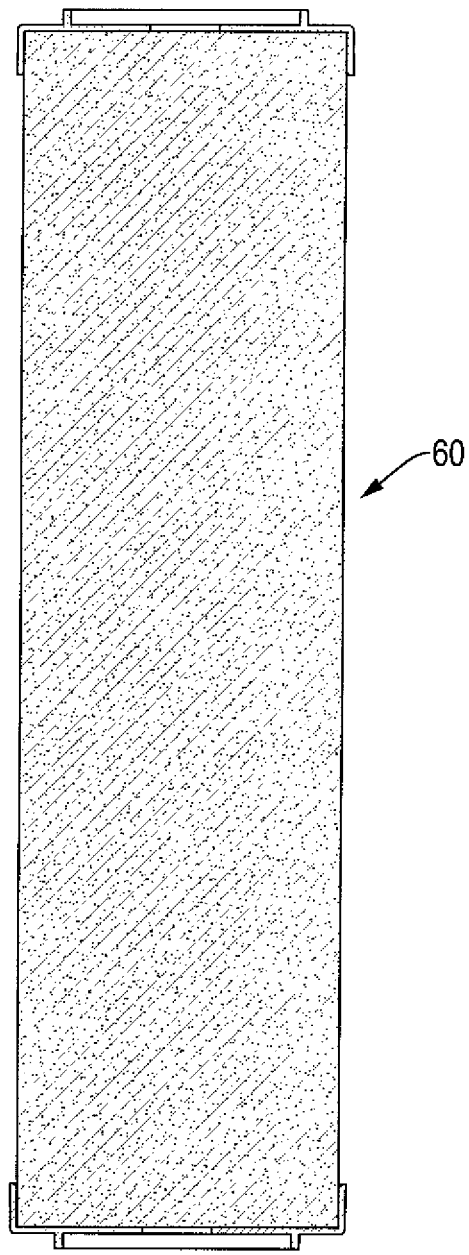
FIG. 5 is a cross sectional side view of a conventional pressed carbon filter device.

With reference to FIG. 4, in assembling, the heat-pressed activated carbon polypropylene composite filter device is combined in a water purification device 50. The water purification device 50 has an inlet 51 and an outlet 52. The inlet 51 is connected with a water source, such as a running water source, and leads the water to flow in the water purification device 50. The outlet 52 is connected with and communicates with one of the filter connectors 20.

After the water flows into the water purification device 50, the water flows through the polypropylene layer 32 to be first filtered. The polypropylene layer 32 can isolate the mud in the water from the carbon-polypropylene filter layer 31, such that the mud in the water will not infiltrate into the carbon-polypropylene filter layer 31. Then, the water flows through the carbon-polypropylene filter layer 31 to be double filtered. The water can be filtered by the carbon-polypropylene filter layer 31 in even flows, since the activated carbon granules 311 are spread evenly on the carbon-polypropylene filter layer 31 and cannot be flaked over the carbon-polypropylene filter layer 31 since the activated carbon granules 311 are heat-pressed. After the water flows through the carbon-polypropylene filter layer 31, the unpleasant odor of the water can be removed by the activated carbon granules 311 of the carbon-polypropylene filter layer 31.

Then, the water flows through the central filtering core 10 to be triple filtered. After the water flows through the central filtering core 10, the impurities of the water can be filtered off and captured on the central filtering core 10. Finally, the water flows in the central filtering core 10 and is exported out of the water purification device 50 from the outlet 52.

From the above description, it is noted that the present invention has the better filtering effect compared with the conventional filters as described below:

1. The activated carbon granules 311 are mounted on the carbon-polypropylene filter layer 31 evenly and firmly and cannot be flaked easily over the carbon-polypropylene filter layer 31, since the activated carbon granules 311 are heat-pressed. Therefore, the water can go through the activated carbon granules 311 in even flows to be filtered effectively.

2. The polypropylene layer 32 is directly covered on the carbon-polypropylene filter layer 31 by a meltblown process, such that the conventional unwoven layer that is mounted around the composite filtering core 30 is omitted. The polypropylene layer 32 can prevent the mud in the water from clogging the carbon-polypropylene filter layer 31.

3. The central filtering core 10 can provide a further cleaning effect for the water. Therefore, the water can be filtered effectively.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat-pressed activated carbon polypropylene composite filter device having:
    a hollow central filtering core being tubular and having two ends;
    a composite filtering core being tubular, mounted around the central filtering core and having:
        two ends;
        a carbon-polypropylene filter layer wound multiple times around the hollow central filtering core to form a tubular structure and made of nonwoven polypropylene on which multiple activated carbon granules are heat-pressed; and
        a polypropylene layer made of polypropylene and covered on the carbon-polypropylene filter layer by a meltblown process;
    two filter connectors, each of the two filter connectors consisting of a first portion and a second portion, a diameter of the first portion being smaller than that of the second portion, and the first portions of the two filter connectors being inserted into the two ends of the hollow central filtering core respectively, and
    two covers each having an outer portion and an inner portion, the inner portion being inserted into the second portion, the outer portion covering an end of the composite filtering core.

2. The heat-pressed activated carbon polypropylene composite filter device as claimed in claim 1, wherein the central filtering core is made of meltblown polypropylene.

* * * * *